ent Office 3,534,065
Patented Oct. 13, 1970

3,534,065
COUMARIN DERIVATIVES
Lewis Irvin Krimen, Lake Bluff, Ill., assignor to Abbott Laboratories, North Chicago, Ill., a corporation of Illinois
No Drawing. Filed Dec. 3, 1968, Ser. No. 780,891
Int. Cl. C07d 7/26
U.S. Cl. 260—343.2                                    6 Claims

ABSTRACT OF THE DISCLOSURE

A new process for preparing 3-(diethylaminoethyl)-4-methyl-7-(alkoxycarbonylmethoxy)-coumarin from the corresponding 7-hydroxycoumarin using an alkyl haloacetate and sodium hydride in dimethylsulfoxide produces excellent yields in a short time.

---

4-methylcoumarin derivatives carrying a dialkylaminoalkyl group in the 3-position and an alkoxycarbonylmethyl ether group in the 7-position have been found to have valuable anti-anginal properties. Unfortunately, the processes known for the synthesis of these compounds have not been satisfactory because they either require prolonged reaction times and/or produce poor yields.

It is, therefore, the main object of the present invention to provide a new process for preparing 3-(diethylaminoethyl)-4-methyl - 7 - (alkoxycarbonylmethoxy)-coumarins by a fast and practical method which produces high yields of the desired compound and simple and easy recovery of the material.

These and other objects are accomplished by stirring a mixture of sodium hydride and 3-(diethylaminoethyl)-4-methyl-7-hydroxycoumarin in dimethylsulfoxide for a few minutes and adding to that suspension an equimolar amount of an alkyl haloacetate, stirring this mixture for at least a few minutes, and recovering the formed 3-(diethylaminoethyl) - 4 - methyl - 7 - (alkoxycarbonylmethoxy)-coumarin from the reaction mixture. Throughout the reaction, the temperature in the reaction vessel is preferably kept between 0 and 50° C. and, because of the presence of sodium hydride, the reaction is preferably carried out in an inert atmosphere.

The amount of sodium hydride used should be at least a stoichiometric amount; a slight excess is advisable since any excess present is easily destroyed during the recovery of the desired coumarin derivative. The amount of the alkyl haloacetate used should be a molar equivalent to the amount of the hydroxycoumarin derivative used as the starting material. Again, a slight excess may be used but no advantage is derived therefrom.

The amount of the dimethylsulfoxide used is of little consequence since this solvent acts mainly as a reaction medium. For practical purposes, about 1-6 liters of dimethylsulfoxide should be used per mole of the coumarin derivative. Since the reaction between the sodium hydride and the hydroxycoumarin derivative is practically instantaneous, only a few minutes of stirring is necessary for that part of the reaction. However, to assure maximum conversion, stirring is preferably continued for at least 30 minutes. An excellent temperature for this reaction is room temperature: neither heating nor cooling is required, although the reaction can be equally well performed at 0° or 50° C. The reaction between the formed sodium base of the 7-hydroxycoumarin derivative and the alkyl haloacetate is also instantaneous and can be performed at room temperature.

The 3-(diethylaminoethyl)-4-methyl - 7 - hydroxycoumarin may be used in the form of the free base or as an acid addition salt thereof. In case of using an acid addition salt, the amount of sodium hydride used must be doubled in order to tie up the acid present. Of course, the dimethylsulfoxide as well as all reactants must be water-free since the reaction involves the use of sodium hydride. For reasons of safety, the reaction is best carried out under an inert atmosphere: a cheap and practical method consists in replacing the air in the reaction vessel with nitrogen, but other inert gases may also be used.

The present invention is best understood by reference to the following examples which are given here only as illustrations and are not meant to limit the invention in any respect.

EXAMPLE 1

A mixture of 46.8 g. (0.15 mole) of 3-diethylaminoethyl)-4-methyl-7-hydroxycoumarin hydrochloride, 15 g. (0.3 mole) of sodium hydride and 450 ml. of dimethylsulfoxide are stirred at at a temperature of between 25 and 32° C. After one hour, 22.6 g. (0.15 mole) of t-butyl chloroacetate is added and the mixture is stirred at room temperature for five hours. The obtained slurry is poured into ice water. The crude 3-(diethylaminoethyl)-4-methyl - 7 - (t - butoxycarbonylmethoxy)-coumarin is filtered off and air-dried.

The corresponding hydrochloride salt is prepared by heating the above product in 250 ml. of ethyl acetate and treating the hot solution with charcoal before filtration. The filtrate is cooled to room temperature and a solution of hydrochloric acid in isopropyl ether is added until the pH is adjusted to 6. The solids are filtered off and dried to produce 3-(diethylaminoethyl)-4-methyl-7-(t-butoxycarbonylmethoxy)-coumarin hydrochloride in excellent purity; it melts at 200–4° C.

EXAMPLE 2

In a repetition of the process of Example 1, 234 g. of 3-(diethylaminoethyl)-4-methyl-7-hydroxycoumarin hydrochloride, 75 g. of sodium hydride and 113 g. of n-butylchloroacetate are stirred in 2.1 liters of dimethylsulfoxide at room temperature in the above described manner, producing 281 g. of 3-(dimethylaminoethyl)-4-methyl-7-(n-butoxycarbonylmethoxy)-coumarin in a purity of over 99%.

The corresponding hydrochloride salt is made by dissolving the free base in ethyl acetate and isopropyl ether, gassing the solution with anhydrous hydrogen chloride to a pH of 5–6 and centrifuging the obtained slurry. The solids obtained are washed with diethyl ether and vacuum dried. The thoroughly dried hydrochloride salt melts at 117–20° C.

Although the above examples use butyl esters of chloroacetic acid as one of the reactants, equally high yields of equally pure material are obtained by using the corresponding bromoacetic acid esters. Of course, other esters such as the methyl, ethyl, propyl, isopropyl, isobutyl, and the various pentyl esters may be used with equal success in producing analogous products of the formula

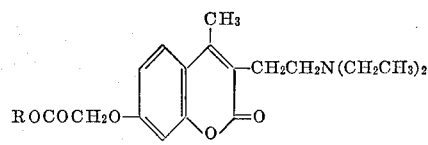

wherein R is loweralkyl of 1–5 carbon atoms. The yields obtained with the new process are mostly above 90% of theory, frequently 94–96% when operating with sufficiently large batch sizes, and the products obtained are of 99.0–99.9% purity as determined through titration assays. If recrystallization should be desired, isopropanol or other alcohols or alcohol/ether mixtures may be used.

What is claimed is:
1. The process of preparing a coumarin derivative of the formula

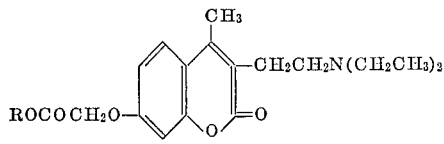

wherein R is a linear or branced alkyl group of 1–5 carbon atoms, consisting essentially of stirring sodium hydride and dry dimethylsulfoxide for a few minutes with 3-(diethylaminoethyl)-4-methyl-7-hydroxycoumarin at a temperature between 0 and 50° C., adding to the formed suspension at least a stoichiometric amount of an acetate of the formula XCH₂COOR wherein R has the above meaning and X stands for bromine or chlorine, stirring the mixture at a temperature of between 0 and 50° C. for a period of a few minutes to a few hours, and isolating said coumarin derivative from said reaction mixture.

2. The process of claim 1 wherein said acetate is t-butyl chloroacetate.

3. The process of claim 1 wherein said acetate is n-butyl chloroacetate.

4. The process of claim 1 wherein the dimethylsulfoxide is used in an amount of between 1 and 6 liters per mole of said 3-(diethylaminoethyl)-4-methyl-7-hydroxycoumarin.

5. The process of claim 1 wherein said coumarin derivative is isolated by diluting the reaction mixture with cold water and recovering the coumarin ester by filtration.

6. The process of claim 1 wherein 3-(diethylaminoethyl)-4-methyl-7-hydroxycoumarin is used in the form of an acid addition salt.

References Cited

UNITED STATES PATENTS 3,243,442   3/1966   Ritter et al. _____ 260—343.2

HENRY R. JILES, Primary Examiner

J. M. FORD, Assistant Examiner